(12) United States Patent
Goto

(10) Patent No.: US 7,902,988 B2
(45) Date of Patent: Mar. 8, 2011

(54) ILLUMINANCE SENSOR FOR VEHICLE

(75) Inventor: Koichi Goto, Kariya (JP)

(73) Assignee: Denson Corporation, Kariya (JP)

( * ) Notice: Subject to any disclaimer, the term of this patent is extended or adjusted under 35 U.S.C. 154(b) by 283 days.

(21) Appl. No.: 12/139,016

(22) Filed: Jun. 13, 2008

(65) Prior Publication Data

US 2009/0085730 A1 Apr. 2, 2009

(30) Foreign Application Priority Data

Oct. 1, 2007 (JP) ................................. 2007-257835

(51) Int. Cl.
*G08B 21/00* (2006.01)

(52) U.S. Cl. ...................... 340/602; 340/332; 340/815.75

(58) Field of Classification Search .................. 340/602, 340/600–601, 641–644, 332, 815.45, 815.75, 340/463, 555, 604, 619, 618

See application file for complete search history.

(56) References Cited

U.S. PATENT DOCUMENTS

| | | | | |
|---|---|---|---|---|
| 5,426,589 | A * | 6/1995 | Kitagawa et al. | 700/274 |
| 6,014,207 | A * | 1/2000 | Suzuki et al. | 356/229 |
| 6,257,363 | B1 * | 7/2001 | Midorikawa et al. | 180/268 |
| 6,293,686 | B1 * | 9/2001 | Hayami et al. | 362/465 |
| 6,800,959 | B2 * | 10/2004 | Herrmann | 307/10.1 |
| 7,385,216 | B2 | 6/2008 | Yoshigoe et al. | |
| 7,429,745 | B2 * | 9/2008 | Yoshigoe et al. | 250/573 |
| 2003/0160158 | A1 | 8/2003 | Ishino et al. | |
| 2004/0201483 | A1 * | 10/2004 | Stam et al. | 340/600 |
| 2005/0036325 | A1 * | 2/2005 | Furusawa et al. | 362/460 |
| 2005/0178954 | A1 | 8/2005 | Yukawa | |

FOREIGN PATENT DOCUMENTS

| | | |
|---|---|---|
| JP | 7-16148 | 3/1995 |
| JP | 10-96791 | 4/1998 |
| JP | 2000-187786 | 7/2000 |
| JP | 2003-337657 | 11/2003 |
| JP | 2004-198214 | 7/2004 |
| JP | 2006-170768 | 6/2006 |

OTHER PUBLICATIONS

Japanese Office Action dated Mar. 30, 2010, issued in corresponding Japanese Application No. 2007-257835, with English translation.
Japanese Office Action dated Aug. 18, 2009, issued in corresponding Japanese Application No. 2007-257835, with English translation.

* cited by examiner

*Primary Examiner* — Daniel Previl
(74) *Attorney, Agent, or Firm* — Nixon & Vanderhye PC

(57) ABSTRACT

An illuminance sensor for detecting brightness of outside a vehicle having a windshield includes first and second light receiving elements and a light emitting element for emitting light to the windshield. The first light receiving element outputs a first signal corresponding to outside light. The light emitted from the light emitting element is reflected at an outside surface of the windshield. The second light receiving element outputs a second signal corresponding to the reflected light. The outside light passes a first region of the windshield through which the light emitted from the light emitting element passes or a second region of the windshield through which the reflected light passes. The first signal is corrected based on the second signal to detect the brightness.

11 Claims, 4 Drawing Sheets

| | | LIGHT CONT. SW | | | |
|---|---|---|---|---|---|
| | | OFF | TAIL | HEAD | AUTO |
| WIPER CONT SW | OFF | × | × | × | IL |
| | LO | × | × | × | IL |
| | HI | × | × | × | IL |
| | AUTO | RD | RD | RD | BOTH |

# ILLUMINANCE SENSOR FOR VEHICLE

CROSS REFERENCE TO RELATED APPLICATION

This application is based on Japanese Patent Application No. 2007-257835 filed on Oct. 1, 2007, the disclosure of which is incorporated herein by reference.

FIELD OF THE INVENTION

The present invention relates to an illuminance sensor for a vehicle.

BACKGROUND OF THE INVENTION

There is an illuminance sensor which is disclosed in JP-A-2004-506569 corresponding to U.S. Pat. No. 6,800,959. The constitution of the sensor is as follows. Outside light is transmitted through a windshield of a vehicle and a second light guide, and is received by a first receiver. A light emitted from a transmitter is entered to the windshield through a first light guide, and the light is reflected at a surface of the windshield opposite to the first light guide. And then, the reflected light is transmitted once again through the windshield and the first light guide, and is received by a second receiver.

Transmittance of a windshield and a light guide may be decreased due to aging with time. In such a case, it becomes difficult to detect the brightness of outside the vehicle correctly, because a level of a detected signal from the first receiver changes even if the brightness of outside the vehicle is not changed.

The above-mentioned illuminance sensor calculates transmittance of the windshield and the first light guide based on the detected signal from the second receiver. The brightness of outside is detected correctly by correcting the detected signal from the first receiver based on the calculated transmittance of the windshield and the first light guide.

In addition, in the above-mentioned illuminance sensor, the transmitter and the second receiver are used as a raindrop sensor for detecting the amount of raindrop attached to the windshield. When the raindrop is not attached to the windshield, the light from the transmitter is totally reflected at a surface of the windshield. On the other hand, when the raindrop is attached to the windshield, a part of the light from the transmitter is outputted from the windshield through the raindrop. Due to this, the amount of inputted light is decreased compared to the case that the raindrop is not attached to the windshield. Therefore, it is possible to calculate the amount of raindrop based on the detected signal from the second receiver.

In the above-described illuminance sensor, a region in which the outside light is transmitted to send the light to the first receiver is different from a region in which light emitted from the transmitter is transmitted to send the light to a third receiver. That is, the outside light which enters the first receiver and the light from the transmitter which enters the third receiver are passing through different portions, respectively. Therefore, it is difficult to detect the brightness of outside correctly because the transmittances of the two different portions are different from each other, even if the detected signal from the first receiver is corrected.

In a case where a raindrop sensor is assembled into an illuminance sensor integrally, the raindrop sensor should be positioned in the region in which a wiping operation of a wiper is performed because of their function, and in the region which does not block the driver's vision. In order to satisfy these conditions, the raindrop sensor is arranged at the back of a rear-view mirror. This position may correspond to a gradation part of the windshield which is tinted for anti-dazzling. In such a case, it is difficult to detect the brightness of outside correctly, even if the detected signal from the first receiver is corrected.

SUMMARY OF THE INVENTION

In view of the above-described problem, it is an object of the present disclosure to provide an illuminance sensor for detecting the brightness of outside with high accuracy.

According to a first aspect of the present disclosure, an illuminance sensor for detecting brightness of outside a vehicle having a windshield includes: a first light receiving element; a light emitting element arranged in the vehicle; and a second light receiving element. The first light receiving element receives outside light of the vehicle through the windshield. The first light receiving element outputs a first output signal corresponding to the outside light. The light emitting element emits light to the windshield. The light emitted from the light emitting element is reflected at an outside surface of the windshield, which is opposite to inside of the vehicle. The second light receiving element receives the reflected light. The second light receiving element outputs a second output signal corresponding to the reflected light. The outside light passes at least one of a first region of the windshield through which the light emitted from the light emitting element passes toward the outside surface of the windshield and a second region of the windshield through which the reflected light passes. The first output signal is corrected based on the second output signal so that the brightness of outside the vehicle is detected from the corrected first signal.

In the above sensor, the outside light passes at least one of the first region of the windshield through which the light emitted from the light emitting element passes toward the outside surface of the windshield and the second region of the windshield through which the reflected light passes. The transmittance change of the windshield is measured at the region through which the outside light for detecting the brightness of outside the vehicle passes, and the first output signal is corrected based on the measurement. Hereby, it becomes possible for the sensor to detect the brightness outside the vehicle at high accuracy.

According to a second aspect of the present disclosure, an illuminance sensor for detecting brightness of outside a vehicle having a windshield includes: a first light receiving element; a light emitting element arranged in the vehicle; a second light receiving element; and a light guiding member arranged on an inside surface of the windshield. The first light receiving element receives outside light of the vehicle through the windshield and the light guiding member. The first light receiving element outputs a first output signal corresponding to the outside light. The light emitting element emits light to the windshield. The light emitted from the light emitting element is partially reflected at an outside surface of the windshield, which is opposite to the inside surface, so that a first reflected light is provided. The second light receiving element receives the first reflected light. The second light receiving element outputs a second output signal corresponding to the first reflected light. The light emitted from the light emitting element is partially reflected at a reflection surface of the light guiding member, so that a second reflected light is provided. The first light receiving element outputs a third output signal corresponding to the second reflected light. The outside light passes at least one of a first region of the windshield through which the light emitted from the light emitting element passes toward the outside surface of the windshield and a second region of the windshield through which the first reflected light passes. The first output signal is corrected based on the second output signal and the third output signal so that the brightness of outside the vehicle is detected from the corrected first signal.

In the above sensor, the outside light passes at least one of the first region of the windshield through which the light emitted from the light emitting element passes toward the outside surface of the windshield and the second region of the windshield through which the reflected light passes. The transmittance change of the windshield is measured at the region through which the outside light for detecting the brightness of outside the vehicle passes, and the first output signal is corrected based on the measurement. Hereby, it becomes possible for the sensor to detect the brightness outside the vehicle at high accuracy.

According to a third aspect of the present disclosure, a method for detecting brightness of outside a vehicle having a windshield includes steps of: receiving outside light of the vehicle at a first light receiving element through the windshield and a light guiding member; outputting a first output signal corresponding to the outside light from the first light receiving element; emitting light to the windshield from a light emitting element; partially reflecting the light emitted from the light emitting element at an outside surface of the windshield, which is opposite to an inside surface of the windshield, so that a first reflected light is provided; receiving the first reflected light at a second light receiving element; outputting a second output signal corresponding to the first reflected light from the second light receiving element; partially reflecting the light emitted from the light emitting element at a reflection surface of the light guiding member, so that a second reflected light is provided; outputting a third output signal corresponding to the second reflected light from the first light receiving element; and correcting the first output signal based on the second output signal and the third output signal, to detect the brightness of outside the vehicle from the corrected first signal.

In the above method, the outside light passes at least one of the first region of the windshield through which the light emitted from the light emitting element passes toward the outside surface of the windshield and the second region of the windshield through which the reflected light passes. The transmittance change of the windshield is measured at the region through which the outside light for detecting the brightness of outside the vehicle passes, and the first output signal is corrected based on the measurement. Hereby, it becomes possible for the sensor to detect the brightness outside the vehicle at high accuracy.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
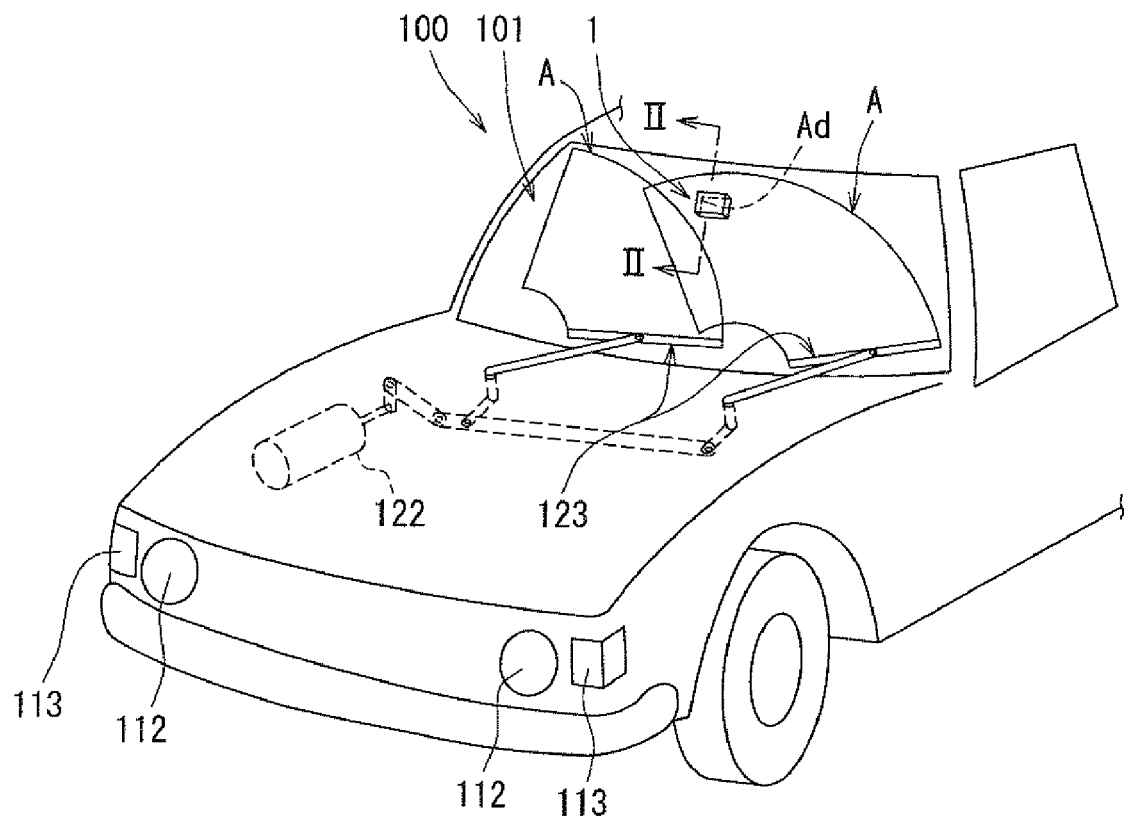
FIG. 1 is a perspective view showing an illuminance-raindrop sensor mounted on a vehicle according to an example embodiment.

As shown in FIG. 1, an illuminance-raindrop sensor 1 is mounted on a front windshield 101 of a vehicle 100, at inside of the vehicle. In a light control apparatus 110 which is equipped with the vehicle 100, the sensor 1 is used to detect the brightness around the vehicle 100. The apparatus 110 automatically switches on and off various light elements which are equipped with the vehicle 100, for example, a headlight 112, a width indicator 113, and a taillight 114, based on the brightness of around the vehicle 100 detected by the sensor 1.

In addition, the sensor 1 has a function detecting the amount of raindrop attached to the windshield 101, and the sensor 1 is connected to a wiper control apparatus 120 equipped with the vehicle 100. The apparatus 120 controls wiping operation of a wiper motor 122 so as to operate at appropriate time intervals, based on the amount of raindrop attached to the windshield 101, detected by the sensor 1.

That is, the sensor 1 has two functions of detecting the brightness of outside a vehicle and detecting the amount of raindrop attached to the windshield 101.

A total constitution of the sensor 1 is shown below.

The sensor 1 is arranged on the windshield 101 at inside of the vehicle. As shown in FIG. 1, the sensor 1 is arranged in the region A in which a wiper 123 wipes a surface of the outside the windshield 101, and behind the rear-view mirror (not shown) which is disposed on an upper side of the vehicle. This is because, the detecting operation of the amount of raindrop needs to be performed immediately after the wiper 123 passes over a detection region Ad of the sensor 1, and the sensor 1 needs to be arranged on the position which does not prevent the driver's front vision as much as possible. The sensor 1 is mounted on the windshield 101 by an optically transparent tape or the like.

Figure 2:
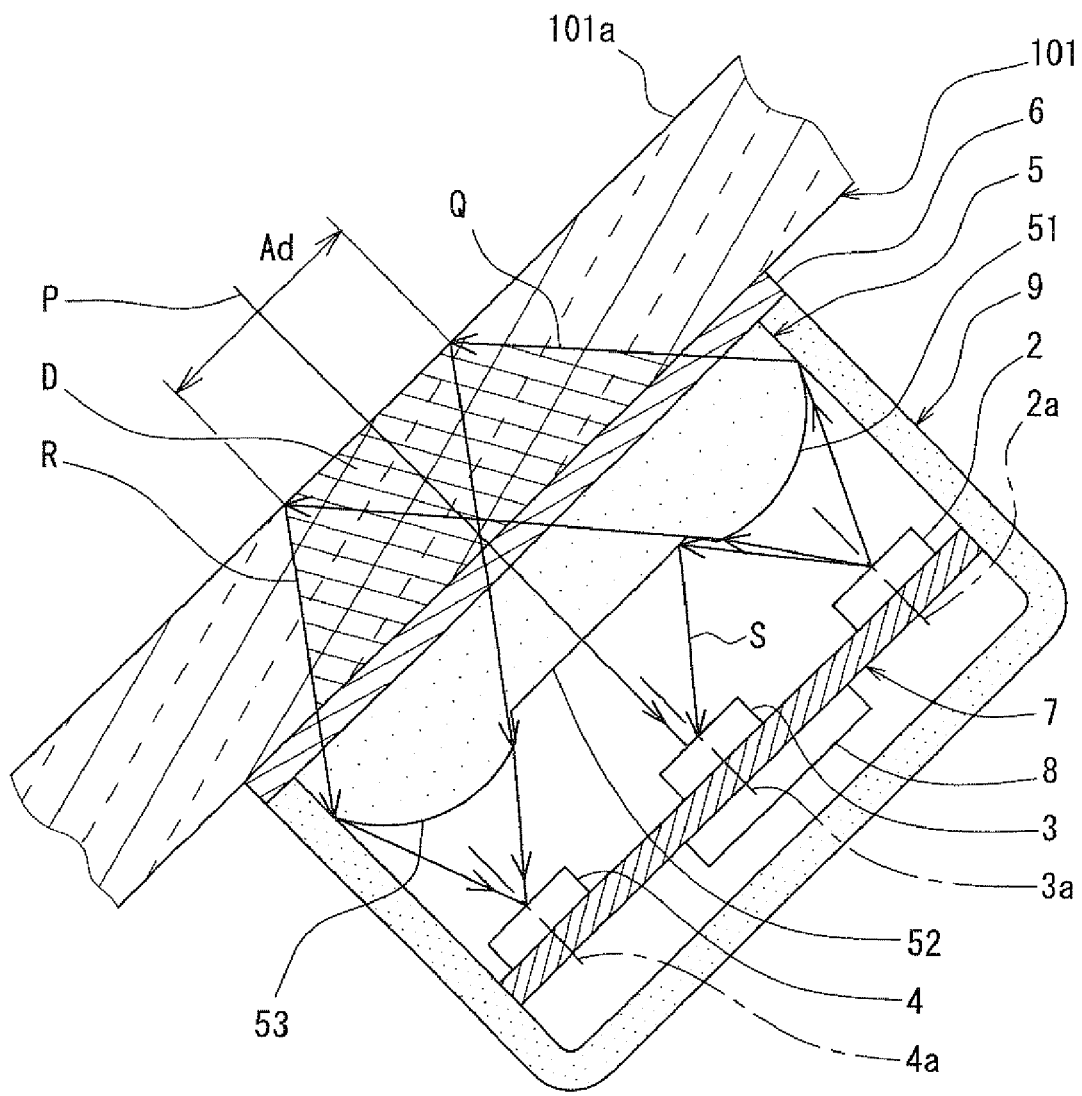
FIG. 2 is a cross sectional view showing the sensor taken along line II-II in FIG. 1.

As shown in FIG. 2, the sensor 1 comprises a lens 5 as a light guiding member, a photodiode 3 as a first light receiving element, a light emitting diode 2 as a light emitting element, a photodiode 4 as a second light receiving element, a control circuit 8, a circuit board 7 and a housing 9. The lens 5 is configured so as to attach to the windshield 101. The photodiode 3 receives light from outside the vehicle which passed through the windshield 101 and the lens 5. The photodiode 4 receives first reflected light which is emitted from the light emitting diode 2 and reflected at the outside surface 101a of the windshield 101. The control circuit 8 controls lighting and driving the light emitting diode 2 and calculates illuminance and the amount of the raindrop by inputting various output signals outputted from the photodiodes 3 and 4. The photodiodes 3 and 4, the light emitting diode 2 and the control circuit 8 are mounted on the circuit board 7. The housing 9 stores these elements.

The housing 9 is formed from fabricated resin material, metal or the like.

The lens 5 is formed from a translucent material such as resin material and glass. A surface of the lens 5 at the side of the windshield 101 is configured to be along the windshield 101. As shown in FIG. 2, a silicon sheet 6 as an optically transparent tape is attached to a whole surface of the sensor 1 such that the tape is sandwiched between the lens 5 and the windshield 101. That is, the sensor 1 is fixed to the windshield 101 through the silicon sheet 6. As shown in FIG. 2, the lens 5 is attached to the windshield 101 through the silicon sheet 6, because the sensor 1 is fixed to the windshield 101. That is, the boundaries among the surface of the lens 5 at the side of the windshield 101, the silicon sheet 6, and the windshield 101 are adhered to each other without containing air at the boundaries. This makes it possible to suppress the loss of light to the minimum, when light passes through the boundaries.

As shown in FIG. 2, the lens 5 comprises a light focus surface 51 which faces the light emitting diode 2, a reflecting surface 52 which faces the photodiode 3, and an outputting surface 53 which faces the photodiode 4.

The surface 51 is formed to be convex to the direction of the light emitting diode 2 side. Although light emitted from the light emitting diode 2 is emitted radially, the light is converged at the surface 51 to make the light almost parallel, and the light travels to the windshield 101.

The surface 52 is formed to be almost planar shape so that a part of light emitted from the light emitting diode 2 can enter the surface 52. The incident light is reflected at the surface 52 and outputted toward the photodiode 3. That is, although the most part of light emitted from the light emitting diode 2 enters the surface 51 and travels to the windshield 101, a part of the light enters the surface 52 and is reflected at the surface 52 and enters the photodiode 3.

The surface 53 is formed to be convex to the direction of the photodiode 4 side. Light emitted from the light emitting diode 2, which is almost parallel, passes through the windshield 101, and the light is reflected at the outside surface 101a of the windshield 101, which is opposite to the lens 5. The reflected light also passes through inside the windshield 101 and the lens 5 as parallel light. The surface 53 functions to focus the reflected light on the photodiode 4, therefore the light travels to the photodiode 4. This makes it possible for the most part of the reflected light to enter the photodiode 4.

The light emitting diode 2, the photodiode 3 and the photodiode 4 are arranged so that the optical axes of the elements 2a, 3a, and 4a are included in the same plane, as shown in FIG. 2. The light emitting diode 2, the photodiode 3, and the photodiode 4 are arranged in this order from the left side of FIG. 2.

The light emitting diode 2, the photodiode 3 and the photodiode 4 are mounted on the board 7, as shown in FIG. 2. The board 7 mounts the circuit 8, which controls lighting and driving the light emitting diode 2 and calculates illuminance and the amount of raindrop based on output signals outputted from the photodiodes 3 and 4.

Next, a constitution of an electrical circuit of the sensor 1 will be described as follows with reference to FIG. 3, in relation to the apparatus 110 and the apparatus 120.

The circuit 8 comprises microcomputer and the like, for example. As shown in FIG. 3, the light emitting diode 2, the photodiode 3 and the photodiode 4 are connected to the circuit 8.

Figures 3, 4:
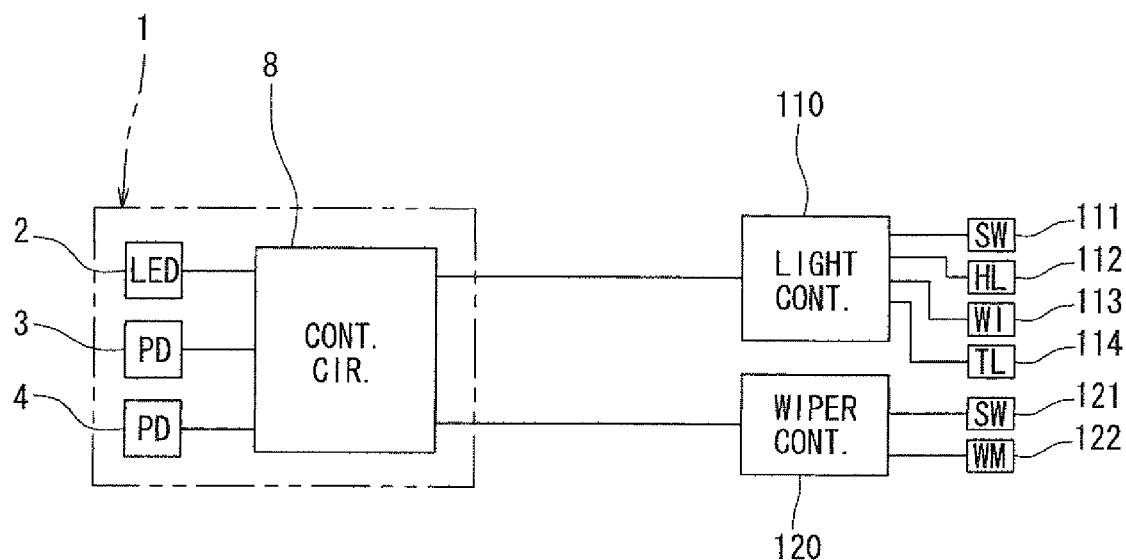
FIG. 3 is a block diagram showing constitution of the sensor.
FIG. 4 is a diagram showing a relationship between selected positions in a light control switch and a wiper control switch and detecting operation of the sensor.

The circuit 8 is connected to each of the apparatus 110 and the apparatus 120, as shown in FIG. 3. A light control switch 111, a headlight 112, a width indicator 113 and a taillight 114 are connected to the apparatus 120. A wiper control switch 121 and a wiper motor 122 are connected to the apparatus 120.

The switch 111 has four operation modes. The four operation modes can be switched by driver's operation. That is, the four modes are as follows; OFF mode in which all light are turned off, TAIL mode in which the width indicator 113 and the taillight 114 are turned on, HEAD mode in which the width indicator 113, the taillight 114 and the headlight 112 are turned on, and AUTO mode in which the switching of the aforementioned three mode are operated automatically. When the AUTO mode is selected by the driver's operation, the apparatus 110 starts to operate, and at the same time the sensor 1 starts detecting the illuminance.

The switch 121 has four operation modes. The four operation modes can be switched by driver's operation. That is, the four modes are as follows; OFF mode in which the wiping operation of the wiper stops, LO mode in which the wiper operates at a low speed, HI mode in which the wiper operates at a high speed, and AUTO mode in which the appropriate wiping operation starts automatically in accordance with the rainfall condition. When the AUTO mode is selected by the driver's operation, the apparatus 120 starts to operate, and at the same time the sensor 1 starts detecting the amount of raindrop.

Next, the detecting illuminance operation and detecting the amount of raindrop operation by the sensor 1 will be explained as follows.

The sensor 1 can perform two types of detecting operations, such as, the detecting illuminance operation of outside the vehicle and the detecting the amount of raindrop operation which is attached to the windshield 101. Firstly, the condition in which the two types detecting operations are performed is shown in FIG. 4. FIG. 4 is a table showing a relationship between selected positions in the switch 111 and the switch 121 and the detecting operation of the sensor 1. In FIG. 4, "X" shows the detecting operation is not performed. RD represents detection of raindrop, IL represents detection of illuminance, and BOTH represents detection of both raindrop and illuminance.

When the switch 111 is selected AUTO mode and the switch 121 is selected one mode other than AUTO mode, the sensor 1 performs the detecting illuminance operation, as shown in FIG. 4.

When the switch 121 is selected AUTO mode and the switch 111 is selected one mode other than AUTO mode, the sensor 1 performs the detecting the amount of raindrop operation, as shown in FIG. 4.

When the switch 111 is selected one mode other than AUTO mode and the switch 121 is selected one mode other than AUTO mode, the sensor 1 stops the detecting operation, as shown in FIG. 4.

When the switch 111 is selected AUTO mode and the switch 121 is selected AUTO mode, the sensor 1 performs both the detecting illuminance operation and the detecting the amount of raindrop operation, as shown in FIG. 4. In this case, the detecting illuminance operation and the detecting amount of raindrop operation are not performed at the same time, but these operations are performed alternately by the predetermined time interval.

Firstly, the detecting illuminance operation by the sensor 1 is described.

Outside light which is light from the outside the vehicle 100 enters the sensor 1 through the windshield 101. The outside light P enters as a parallel light, as shown in FIG. 2. And then, light entered to the photodiode 4 is refracted at the surface 53 of the lens 5, and the refracted light is not entered to the photodiode 4 because the refracted light travels toward the direction deviated from the photodiode 4. In the result, only a part of the outside light P corresponding to the photodiode 3 out of the outside light entered to the detection region Ad of the sensor 1 can enter the photodiode 3. The photodiode 3 receives the part of the outside light P, and outputs a first output signal X which corresponds to the amount of the received light.

When the light emitting diode 2 turns on, inspection light Q radially emitted from the light emitting diode 2 enters the surface 51 of the lens 5 to convert to a parallel light, and the parallel light enters the outside surface 101a of the windshield 101. And then, first reflected light R, which is reflected at the outside surface 101a, is focused by the surface 53 of the lens 5 toward the photodiode 4 and enters the photodiode 4. The photodiode 4 receives the first reflected light R and outputs a second output signal Y which corresponds to the amount of the received light.

When the light emitting diode 2 turns on, a part of the inspection light Q radially emitted from the light emitting diode 2 enters the surface 52 of the lens 5. And then, second reflected light S, which is reflected at the surface 52, enters the photodiode 3, as shown in FIG. 2. Therefore, while the light emitting diode 2 is lighting, the photodiode 3 receives the outside light P and the second reflected light S at the same time, and outputs a total output signal W which corresponds to the amount of the received light.

As described above, the output signal is the first output signal X when the photodiode 3 is received only from the outside light P. The output signal is the total output signal W when the photodiode 3 is received from the outside light P and the second reflected light S which is emitted from the light emitting diode 2. Therefore, the difference between the total output signal W and the first output signal X provides a third output signal Z which is the output signal when the photodiode 3 receives only the second reflected light S emitted from the light emitting diode 2.

The amount of the first output signal X when the photodiode 3 receives the outside light P is proportional to the amount of light of the outside light P, and therefore, it is possible to detect the brightness of outside the vehicle based on the first output signal X.

There is a case that the transmittance of the windshield 101 changes over time as the vehicle 100 is used. For example, the transmittance may be decreased gradually. In the case that the transmittance is decreased, the amount of the first output signal X is decreased compared to the initial transmittance before decreasing, even if the brightness of outside the vehicle is not changed. For this reason, the sensor 1 estimates the illuminance lower than the actual illuminance despite the brightness of outside the vehicle is not changed. In this embodiment, the sensor 1 measures the change of the transmittance of the windshield 101 based on the second output signal Y and the third output signal Z. Therefore, although the amount of the second output signal Y changes with the change of the transmittance of the windshield 101, the amount of the third output signal Z does not change. Therefore, the sensor 1 can measure the change of the transmittance of the windshield 101. The first output signal X is corrected based on the result of this measurement, and the brightness of outside the vehicle is measured based on the corrected first output signal X. This makes it possible for the sensor 1 to detect the brightness of outside the vehicle correctly at any time despite the transmittance of the windshield 101 changes.

In addition, as shown in FIG. 2, in the sensor 1, at least one of the inspection light Q for measuring the change of the transmittance of the windshield 101 and the first reflected light R overlaps with the outside light P. In other words, the outside light P passes a region D through which the inspection light Q for measuring the change of the transmittance of the windshield 101 and the first reflected light R passes. The region D is shown by the hatching area in FIG. 2. As also illustrated in FIG. 2, the first light receiving element 3 and the second light receiving element 4 are arranged such that at least one of a first region of the windshield, through which the inspection light Q passes toward the outside surface of the windshield, and a second region of the windshield, through which the first reflected light R passes, overlaps with both a projection of the first light receiving element on the windshield and a projection of the second receiving light element on the windshield. That is, the sensor 1 measures the transmittance change of the windshield 101 at the region through which the outside light P for detecting the brightness of outside the vehicle passes. In this way, it is possible to provide the sensor 1 which can detect the brightness of outside the vehicle correctly with high accuracy by measuring the change of the transmittance of the region in which the outside light P for detecting the brightness outside the vehicle itself in the windshield 101 passes, and by correcting the first output signal X based on the measurement.

The transmittance of the windshield 101, which is measured when the sensor 1 is operated for detecting illuminance, is used for detecting the amount of raindrop with high accuracy during detecting the amount of raindrop as described later. However, it is difficult to measure the transmittance of the windshield 101 correctly, in the case that raindrop is attached to the detection region of the windshield 101. Therefore, in the sensor 1, the transmittance of the windshield 101, which is measured when the switch 111 is in the AUTO mode and the switch 121 is in the OFF mode, is recorded in a record region of the circuit 8 and updated sequentially. That is, the corrected and updated value of the transmittance of the windshield 101 is always stored in a recording means of the circuit 8.

Next, the detecting the amount of raindrop operation by the sensor 1 is shown.

The region detecting the amount of raindrop in the sensor 1 is the region Ad. Specifically, the inspection light Q emitted from the light emitting diode 2 is entered in the region Ad of the windshield 101. The sensor 1 detects the amount of raindrop attached to the region Ad.

When the light emitting diode 2 turns on, the inspection light Q radially emitted from the light emitting diode 2 enters the surface 51 of the lens 5 to convert to a parallel light, and the parallel light enters the outside surface 101a of the windshield 101. And then, the first reflected light R, which is reflected at the outside surface 101a, is focused by the surface 53 of the lens 5 toward the photodiode 4 and enters the photodiode 4. The photodiode 4 receives the first reflected light R and outputs a second output signal Y which corresponds to the amount of the received light.

In the case that raindrop is not attached to the region Ad of the windshield 101, the inspection light Q enters the outside surface 101a of the windshield 101 and is totally reflected. Therefore, the amount of the received light of the photodiode 4 is maximized.

In case of raindrop is attached to the region Ad of the windshield 101, a part of the inspection light Q entered the region, in which raindrop is attached, is outputted toward outside the windshield 101 through the windshield 101 and the raindrop. For this reason, the second output signal Y, which is output from the photodiode 4, is decreased, since the amount of receiving light of the photodiode 4 is decreased compared to the case that raindrop is not attached to the windshield 101. That is, the amount of the second output signal Y which is the output signal in the photodiode 4 changes according to the raindrop attachment condition in the region Ad of the windshield 101. Accordingly, based on the amount of the second output signal Y in the photodiode 4, it becomes possible to detect the amount of raindrop.

During the detecting the amount of raindrop operation as well as during the above-mentioned detecting illuminance operation, the change of the transmittance of the windshield 101 is measured and the second output signal Y is corrected based on the result of the measurement. This makes it possible for the sensor 1 to detect the amount of raindrop correctly. The sensor 1 can detect the amount of raindrop with high accuracy by referring the updated value of the transmittance of the windshield 101 which is stored in the circuit 8 to correct the amount of raindrop.

When the switch 111 is selected to the AUTO mode and the switch 121 is selected AUTO mode, the circuit 8 of the sensor 1 performs the detecting illuminance operation and the detecting the amount of raindrop operation alternately within the predetermined time interval.

In this case, the detecting the amount of raindrop operation is performed in the same way with the above-mentioned operation. On the other hand, in the detecting illuminance operation, detected illuminance value is corrected by referring the updated value of the transmittance of the windshield 101 which is stored in the circuit 8 without the measurement of the transmittance of the windshield 101.

Figure 5:
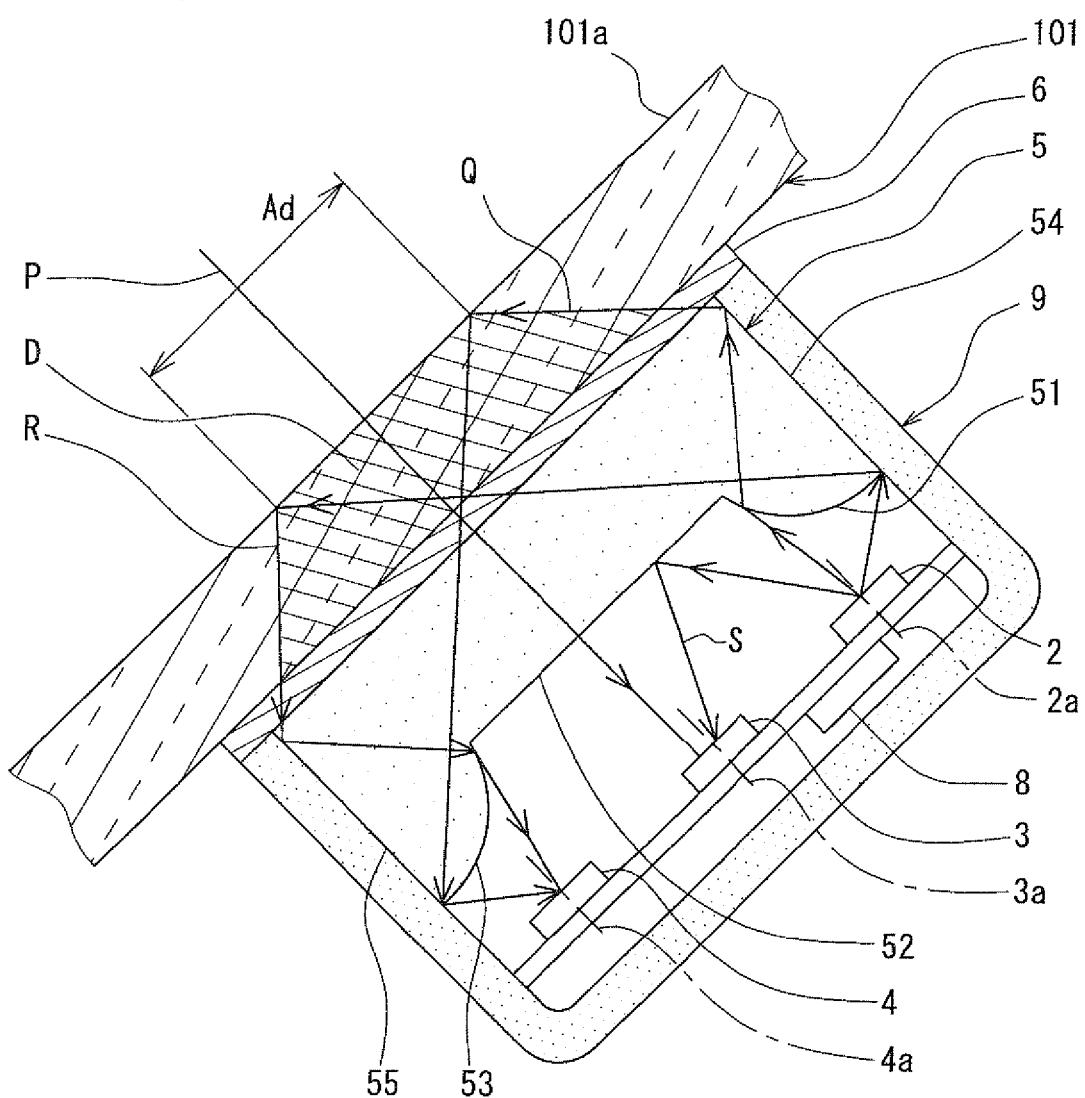
FIG. 5 is a cross sectional view showing an illuminance sensor according to a modification of the example embodiment.

FIG. 5 shows a cross sectional view of a modified example of the sensor 1. A shape of the lens 5 in the sensor 1 is different from the sensor 1 shown in FIG. 2.

In the case of the sensor 1 shown in FIG. 2, the inspection light Q emitted from the light emitting diode 2 enters through the surface 51 and travels toward the outside surface 101a of the windshield 101, and the reflected light R reaches to the surface 53 of the lens 5 from the outside surface 101a. On the other hand, in the sensor 1 shown in FIG. 5, a reflection surface 54 and a reflection surface 55 are formed on the lens 5, as shown in FIG. 5. The inspection light Q emitted from the light emitting diode 2 is entered through the surface 51, and then, the light is reflected at the surface 54 and travels toward the outside surface 101a of the windshield. Furthermore, the reflected light R enters the surface 55 of the lens 5 firstly, and reflected at the surface 55, and then, reaches the surface 53. As in the case of the sensor 1 shown in FIG. 2, the first light receiving element 3 and the second light receiving element 4 are arranged such that at least one of a first region of the windshield, through which the inspection light Q passes toward the outside surface of the windshield, and a second region of the windshield, through which the first reflected light R passes, overlaps with both a projection of the first light receiving element on the windshield and a projection of the second light receiving element on the windshield.

This constitution can be obtained the same effect of the sensor 1 shown in FIG. 2, that is, the change of the transmittance of the windshield 101 is measured at the region of the windshield through which the outside light P for detecting illuminance outside the vehicle passes. And then, by correcting the first output signal X based on the change of the transmittance, it is possible to detect the brightness of outside the vehicle with high accuracy.

Although the sensor 1 includes the photodiode 3 and the photodiode 4 as the first light receiving element and the second light receiving element, the sensor 1 may include other element such as a phototransistor.

In the above embodiment, although an illuminance-raindrop sensor equips with the detecting the amount of raindrop function, a sensor may equip with only the detecting illuminance function without the detecting the amount of raindrop function.

In the above embodiment, although the windshield which is equipped with the sensor 1 is the front windshield 101 which is disposed in front of the driver's sheet, the sensor may be arranged on other window such as a rear windshield.

In the above embodiment, although the detecting the amount of raindrop apparatus is equipped with the vehicle, the sensor may be equipped with a movable body such as an airplane, a railroad vehicle and marine vessel.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An illuminance sensor for detecting brightness of outside a vehicle having a windshield comprising:
   a first light receiving element;
   a light emitting element arranged in the vehicle; and
   a second light receiving element, wherein
   the first light receiving element receives outside light of the vehicle through the windshield,
   the first light receiving element outputs a first output signal corresponding to the outside light,
   the light emitting element emits light to the windshield,
   the light emitted from the light emitting element is reflected at an outside surface of the windshield, which is opposite to inside of the vehicle,
   the second light receiving element receives the reflected light,
   the second light receiving element outputs a second output signal corresponding to the reflected light,
   the outside light passes through at least one of a first region of the windshield through which the light emitted from the light emitting element passes toward the outside surface of the windshield and a second region of the windshield through which the reflected light passes,
   at least one of the first region and the second region of the windshield overlaps with projections of both of the first and second light receiving elements on the windshield, and
   the first output signal is corrected based on the second output signal so that the brightness of outside the vehicle is detected from the corrected first output signal.

2. The illuminance sensor according to claim 1, wherein
   the light emitting element and the second light receiving element provide a raindrop sensor for detecting amount of raindrop attached to the windshield, and
   the raindrop sensor calculates the amount of raindrop based on the second output signal.

3. The illuminance sensor according to claim 1, wherein
   optical axes of the first light receiving element, the second light receiving element and the light emitting element are disposed in a same plane, and
   the light emitting element, the first light receiving element, and the second light receiving element are arranged in this order.

4. An illuminance sensor for detecting brightness of outside a vehicle having a windshield comprising:
   a first light receiving element;
   a light emitting element arranged in the vehicle;
   a second light receiving element; and
   a light guiding member arranged on an inside surface of the windshield, wherein
   the first light receiving element receives outside light of the vehicle through the windshield and the light guiding member,
   the first light receiving element outputs a first output signal corresponding to the outside light,
   the light emitting element emits light to the windshield, the light emitted from the light emitting element is partially reflected at an outside surface of the windshield, which is opposite to the inside surface, so that a first reflected light is provided, the second light receiving element receives the first reflected light, the second light receiving element outputs a second output signal corresponding to the first reflected light, the light emitted from the light emitting element is partially reflected at a reflection surface of the light guiding member, so that a second reflected light is provided, the first light receiving element outputs a third output signal corresponding to the second reflected light, the outside light passes through at least one of a first region of the windshield through which the light emitted from the light emitting element passes toward the outside surface of the windshield and a second region of the windshield through which the first reflected light passes, at least one of the first region and the second region of the windshield overlaps with projections of both of the first and second light receiving elements on the windshield, and the first output signal is corrected based on the second output signal and the third output signal so that the brightness of outside the vehicle is detected from the corrected first output signal.

5. The illuminance sensor according to claim 4, wherein
the light emitting element, the first light receiving element and the second light receiving element provide a raindrop sensor for detecting amount of raindrop attached to the windshield, the second output signal is corrected based on the third output signal, and the raindrop sensor calculates the amount of raindrop based on the corrected second output signal.

6. The illuminance sensor according to claim 4, wherein
an output voltage of the first light receiving element provides the first output signal when the light emitting element does not emit light, a difference between an output voltage of the first light receiving element when the light emitting element emits light and the first output signal provides the third output signal.

7. The illuminance sensor according to claim 4, wherein
optical axes of the first light receiving element, the second light receiving element and the light emitting element are disposed in a same plane, and the light emitting element, the first light receiving element, and the second light receiving element are arranged in this order.

8. A method for detecting brightness of outside a vehicle having a windshield comprising steps of:
receiving outside light of the vehicle at a first light receiving element through the windshield and a light guiding member;

outputting a first output signal corresponding to the outside light from the first light receiving element;

emitting light to the windshield from a light emitting element;

partially reflecting the light emitted from the light emitting element at an outside surface of the windshield, which is opposite to an inside surface of the windshield, so that a first reflected light is provided;

receiving the first reflected light at a second light receiving element;

outputting a second output signal corresponding to the first reflected light from the second light receiving element;

partially reflecting the light emitted from the light emitting element at a reflection surface of the light guiding member, so that a second reflected light is provided;

outputting a third output signal corresponding to the second reflected light from the first light receiving element;

arranging the light emitting element and the first and second light receiving elements such that the outside light passes through at least one of a first region of the windshield, through which the light emitted from the light emitting electrode passes toward the outside surface of the windshield, and a second region of the windshield, through which the first reflected light passes;

arranging the first and second light receiving elements such that at least one of the first region and the second region of the windshield overlaps with projections of both of the first and second light receiving elements on the windshield, and correcting the first output signal based on the second output signal and the third output signal, to detect the brightness of outside the vehicle from the corrected first output signal.

9. The method according to claim 8, wherein
the light emitting element, the first light receiving element and the second light receiving element provide a raindrop sensor for detecting amount of raindrop attached to the windshield, the second output signal is corrected based on the third output signal, and the raindrop sensor calculates the amount of raindrop based on the corrected second output signal.

10. The method according to claim 8, wherein
an output voltage of the first light receiving element provides the first output signal when the light emitting element does not emit light, and a difference between an output voltage of the first light receiving element when the light emitting element emits light and the first output signal provides the third output signal.

11. The method according to claim 8, wherein
optical axes of the first light receiving element, the second light receiving element and the light emitting element are disposed in a same plane, and the light emitting element, the first light receiving element, and the second light receiving element are arranged in this order.

* * * * *